(12) United States Patent
Tucker

(10) Patent No.: US 11,181,221 B1
(45) Date of Patent: Nov. 23, 2021

(54) PULL OFF PIPE CAP

(71) Applicant: William Randall Tucker, Naples, FL (US)

(72) Inventor: William Randall Tucker, Naples, FL (US)

( * ) Notice: Subject to any disclaimer, the term of this patent is extended or adjusted under 35 U.S.C. 154(b) by 0 days.

(21) Appl. No.: 16/519,663

(22) Filed: Jul. 23, 2019

(51) Int. Cl.
    *F16L 55/115*     (2006.01)

(52) U.S. Cl.
    CPC .................. *F16L 55/115* (2013.01)

(58) Field of Classification Search
    CPC ........ B65D 2517/5081; B65D 17/4011; B65D 51/20; B65D 2251/0018; B65D 251/0071; B65D 41/32; F16L 55/115
    USPC ..................... 138/89; 220/270, 258.2, 258.3; 215/253–256, 305, 274
    See application file for complete search history.

(56) References Cited

U.S. PATENT DOCUMENTS

| | | | | |
|---|---|---|---|---|
| 3,612,340 A | * | 10/1971 | Heffran ................. | B65D 41/32 215/255 |
| 3,734,333 A | * | 5/1973 | Foss ....................... | B65D 51/20 215/255 |
| 3,765,561 A | * | 10/1973 | Hekal ................. | B65D 17/4011 220/270 |
| 3,963,140 A | * | 6/1976 | Harding ................. | B65D 41/44 215/254 |
| 4,440,310 A | * | 4/1984 | Heyn ................... | B65D 17/508 220/258.2 |
| 4,951,326 A | * | 8/1990 | Barnes ............... | A61H 33/6063 138/100 |
| 5,004,110 A | * | 4/1991 | Osip ..................... | B65D 41/48 215/232 |
| 5,042,226 A | * | 8/1991 | Osip ..................... | B65D 41/32 53/412 |
| 5,069,356 A | * | 12/1991 | Zysset ................ | B65D 17/4011 220/276 |
| 6,193,094 B1 | * | 2/2001 | Diamond ............ | B65D 17/502 220/254.1 |
| 6,595,243 B2 | * | 7/2003 | Tarr ...................... | F16L 55/115 138/96 R |
| 7,731,048 B2 | * | 6/2010 | Teixeira Alvares ....... B65D 21/0219 220/270 |
| 8,051,879 B2 | * | 11/2011 | Zeyfang ................ | F16L 57/005 138/96 T |
| 9,027,603 B2 | * | 5/2015 | Zeyfang .............. | F16L 55/1141 138/96 R |
| 9,649,254 B2 | * | 5/2017 | Frishman ............. | B65D 47/141 |
| 2002/0063131 A1 | * | 5/2002 | Diamond ............... | B65D 51/16 220/309.1 |
| 2003/0201266 A1 | * | 10/2003 | Steffan ................... | B65D 59/06 220/258.2 |
| 2005/0029267 A1 | * | 2/2005 | Martin ................. | B65D 17/506 220/270 |
| 2012/0227854 A1 | * | 9/2012 | Zeyfang ................ | F16L 57/005 138/96 T |

(Continued)

*Primary Examiner* — Patrick F Brinson
(74) *Attorney, Agent, or Firm* — Edward M. Livingston, Esq.; Livingston Law, P.A.

(57) ABSTRACT

A pull off pipe cap (1) that fully seals the end of the pipe or pipe fitting to protect the pipe during construction especially while pouring concrete foundations around pipes. The pull off pipe cap is easily found under poured concrete and is easily removed from the pipe or pipe fitting without a need for demolition of the concrete slab and excavation around the pipe.

10 Claims, 4 Drawing Sheets

(56) References Cited

U.S. PATENT DOCUMENTS

2015/0157535 A1* 6/2015 Frishman ............ B65D 51/002
604/403

* cited by examiner

PULL OFF PIPE CAP

FIELD OF THE INVENTION

This invention relates to plumbing and more particularly to a pull off pipe cap used to temporarily cap pipes or pipe fittings run under concrete slabs for plumbing, electrical, HVAC and for irrigation.

BACKGROUND OF THE INVENTION

Plumbing is one of the rough-in elements of construction and is generally run under concrete slabs during the construction of structures supported on concrete slab foundations. During the initial building of a structure that has a concrete slab foundation, any plumbing that runs under the structure must be run before the concrete is poured. It is important that the plumbing not interfere with the slope and/or integrity of the concrete slab. For this reason, it is preferred that any utility pipes, including electrical conduit piping, be capped below the floor level.

This is especially important in concrete tilt-up wall construction, wherein concrete wall panels are cast on flat floors or on floors with constant slope. Slabs with slope changes can affect the integrity of any wall cast thereon. Utility pipes penetrating above the floor slab also interfere with the screeding process and can be an obstacle for movement of the walls via crane. These projections can also become a source of cracks in the slab.

However, capping pipes below floor level causes problems for plumbers and electricians. First, the capped pipes have to be located under the poured concrete. Next, the pipes have to be excavated by hammering large holes in the slab around the capped pipes and digging down far enough access to the pipes to cut the caps off of the pipes and splice extending pipes out of the floor. Finally, the holes must be backfilled and patched with new concrete. This is a very time consuming and labor intensive process.

Therefore, a need exists for a pull off pipe cap that fully seals the end of the pipe or pipe fitting, is easily found under poured concrete, and is easily removed from the pipe or pipe fitting without the need for demolition of the concrete slab and excavation around the pipe.

SUMMARY OF THE INVENTION

The primary object of the present invention is to provide a pull off pipe cap that fully seals the end of the pipe or pipe fitting, is easily found under poured concrete, and is easily removed from the pipe or pipe fitting without the need for demolition of the concrete slab and excavation around the pipe.

An additional object of the present invention is to provide a pull off pipe cap that fully seals the end of a pipe or pipe fitting, thereby allowing the piping and fittings to be tested for leaks.

The present invention fulfills the above and other objects by providing a pull off pipe cap having a tubular body with a perimeter wall having an inner surface, an outer surface, a top edge and a bottom edge. A circular-shaped pull off lid having an upper surface, a lower surface and a perimeter edge is removeably attached to the perimeter wall. The perimeter edge of the pull off lid may be attached to the inner surface of the perimeter wall. Alternatively, the perimeter edge of the pull off lid may be attached to the top edge of the perimeter wall of the tubular body.

The pull off lid may be attached to the perimeter wall via an adhesive or via a scored line that tears when upward pressure is applied to the pull off lid. A pull ring is preferably located proximate to the perimeter edge of the pull off lid. The pull ring may be stationary or attached via a pivot point, such as a rivet, that allows the pull ring to act as a lever so when a proximal end of the pull ring is pulled upward a distal end of the pull ring pushes downward on the perimeter edge of the pull off lid breaking the attachment between the pull off lid and the perimeter wall of the tubular housing.

Alternatively, the pull off pipe cap may have a tubular housing with a perimeter wall and integrated lid. The pull off pipe cap is removeably attached to an end of a pipe or pipe fitting via a temporary adhesive. A pull ring allows the pull off pipe cap to be pulled upward thereby breaking the adhesive seal between he pull off pipe cap and the pipe. The pull off pipe cap may fit inside of the pipe and have a flange that extends over an upper edge of the pipe. Alternatively, the pull off pipe cap may fit over the end of the pipe or pipe fitting.

The tubular housing and pull off pipe cap of the present invention may be incorporated into any type of pipe fitting including, couplings, joint fittings, drains, flanges, clean outs, test fittings and so forth. The pull off may also be integrated into an end of a pipe so a fitting does not have to be secured to the pipe on a jobsite.

After the pull off pipe cap is installed on a pipe, the pipe may be tested for leaks and/or covered with concrete. Then, after the concrete cures and intermediate construction is finished, the pull off pipe cap is located beneath the concrete. The concrete may then be chipped away to reveal the pull off pipe cap. The pull off lid may then be removed from the perimeter wall off the tubular housing revealing an open end of the pipe or pipe fitting. The pull off pipe cap of the present invention may be incorporated into a coupling and or a cap that fit over a pipe having a flared end. Therefore, it is not necessary to dig out around the pipe but only to remove enough concrete to expose the pull off lid.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
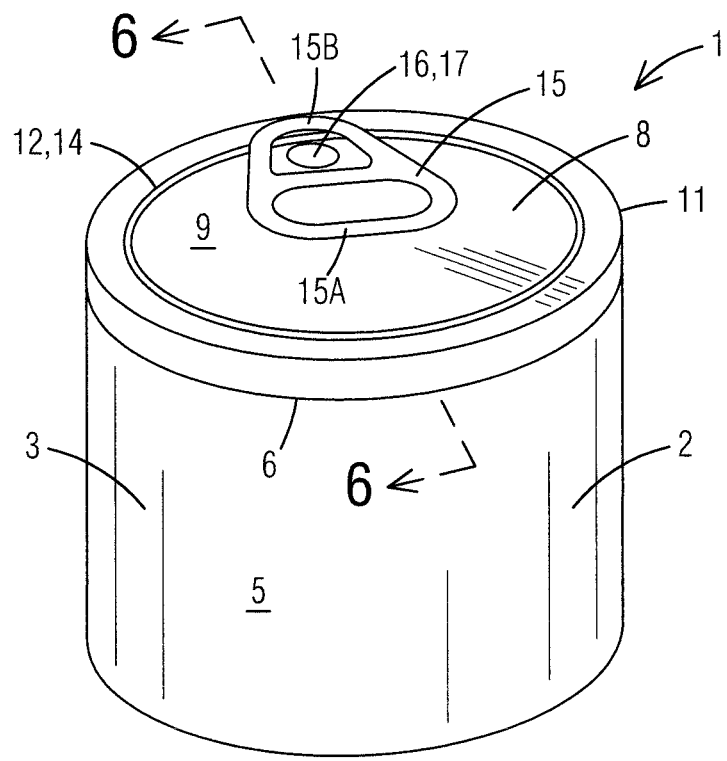
FIG. 1 is a perspective top view of a pull off pipe cap of the present invention wherein the pull off lid is secured proximal to the top edge of the perimeter wall of the tubular body.
Figure 2:
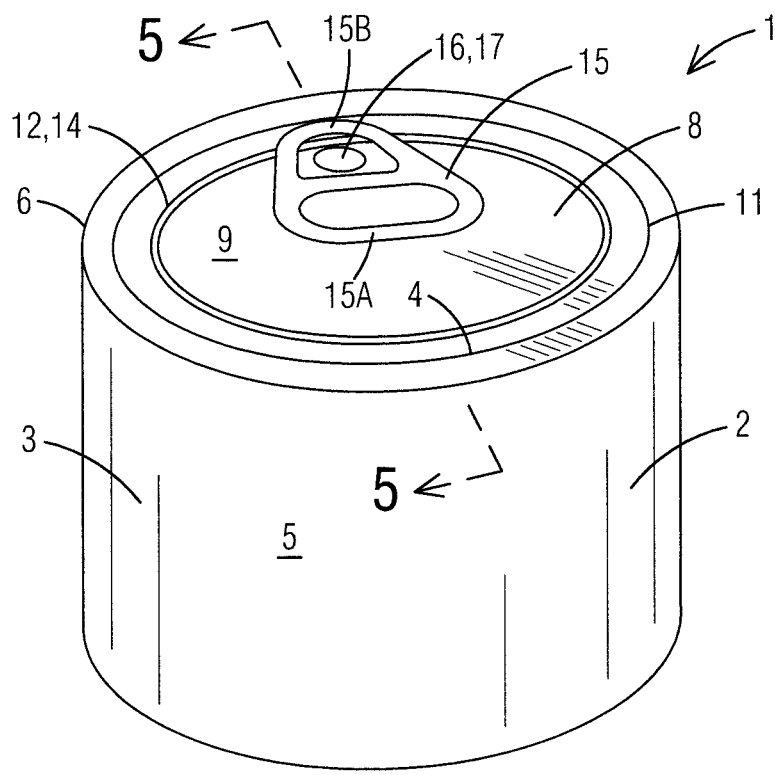
FIG. 2 is a perspective top view of a pull off pipe cap of the present invention wherein the pull off lid is secured to the inner surface of the perimeter wall of the tubular body.
Figure 3:
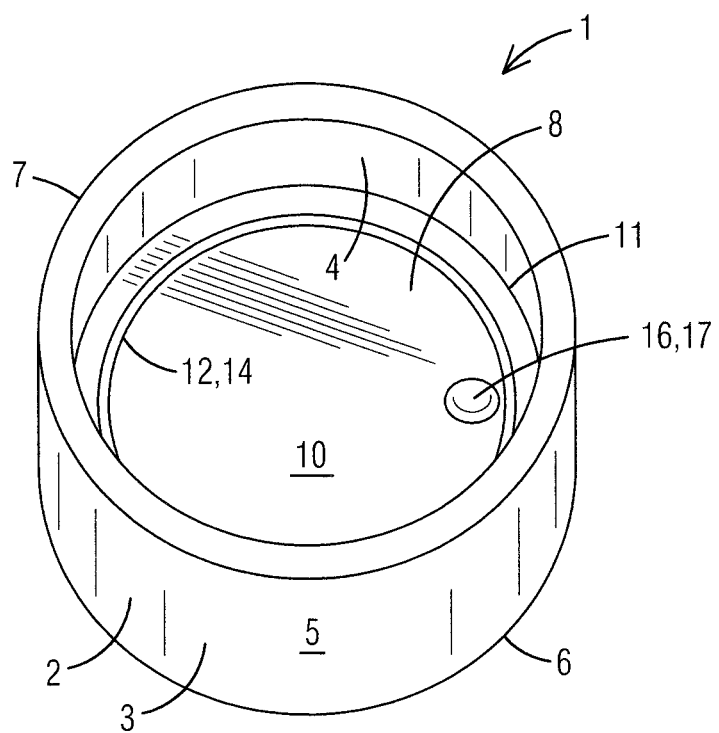
FIG. 3 is a perspective bottom view of a pull off pipe cap of the present invention.
Figure 4:
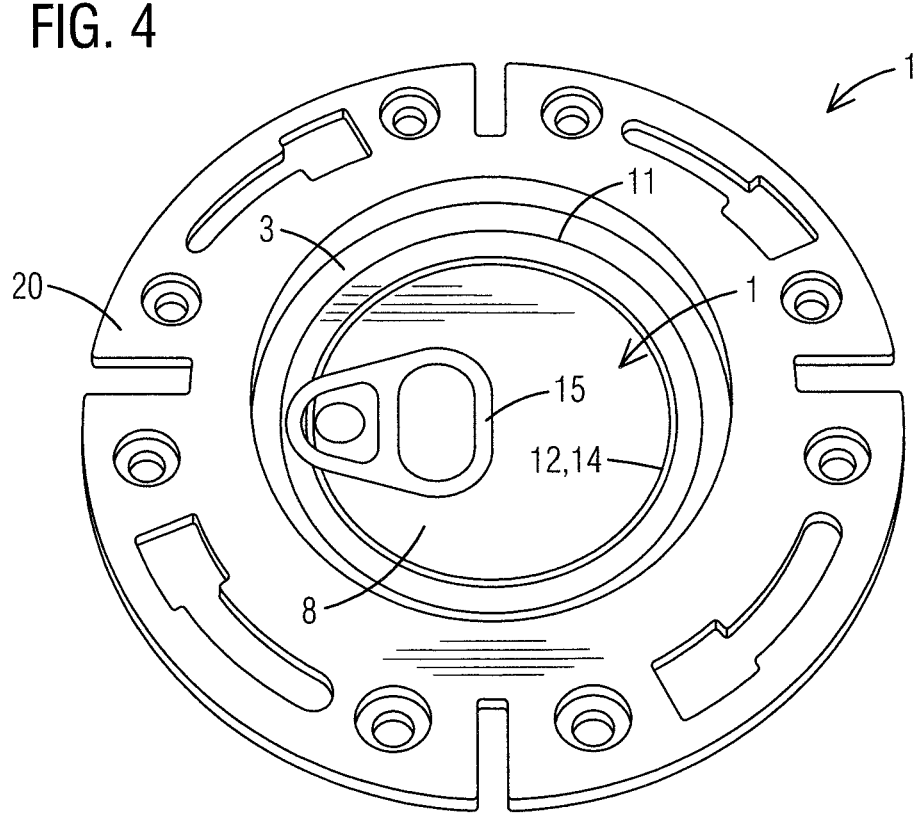
FIG. 4 is a perspective top view of a pull off pipe cap of the present invention wherein the pull off lid is secured proximal to the top edge of the perimeter wall of the tubular body incorporated into a water closet flange fitting.
Figure 5:
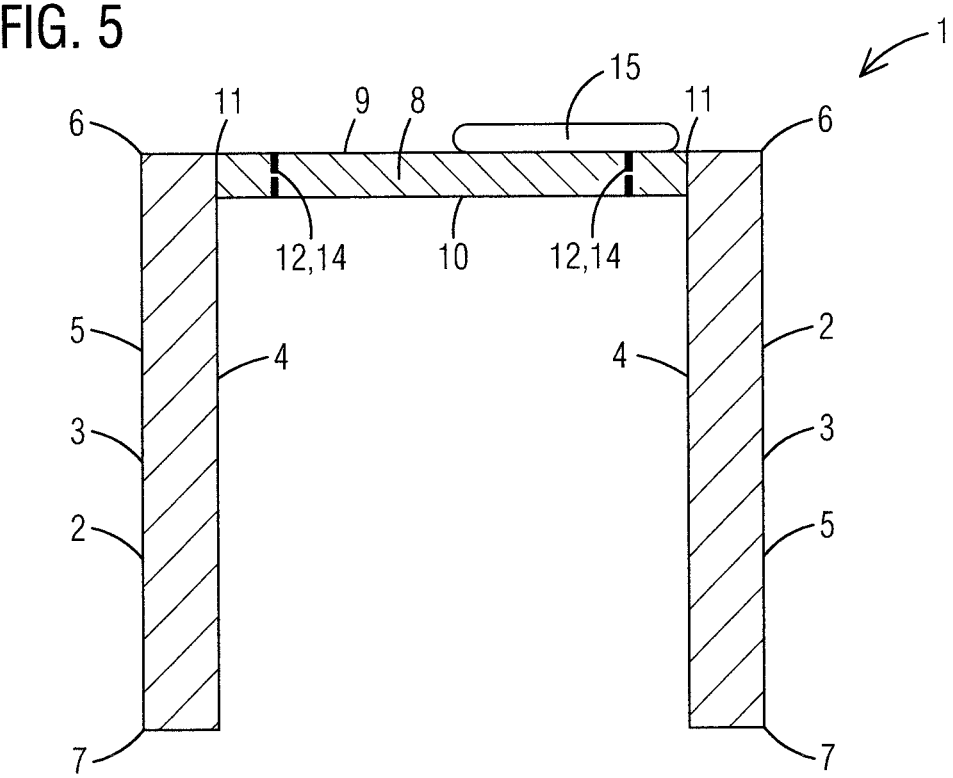
FIG. 5 is a sectional side view of the present invention along line 5-5 of FIG. 2.

For purposes of describing the preferred embodiment, the terminology used in reference to the numbered components in the drawings is as follows:
1. pull off pipe cap, generally
2. tubular body
3. perimeter wall
4. inner surface of perimeter wall
5. outer surface of perimeter wall
6. top edge of perimeter wall
7. bottom edge of perimeter wall
8. pull off lid
9. upper surface of pull off lid
10. lower surface of pull off lid
11. perimeter edge of pull off lid
12. attachment means
13. adhesive
14. scored line
15. pull ring
15A. proximal end of pull ring
15B. distal end of pull ring
16. pivot point
17. rivet
18. integrated lid
19. pipe
20. flange
21. pipe fitting With reference to FIG. 1-6, the pull off pipe cap 1 of the present invention comprises a tubular body 2 having a perimeter wall 3 having an inner surface 4, an outer surface 5, a top edge 6 and a bottom edge 7. A circular-shaped pull off lid 8 having an upper surface 9, a lower surface 10 and a perimeter edge 11 is removeably attached to the perimeter wall 3. The perimeter edge 11 of the pull off lid 8 may be attached to the inner surface 4 of the perimeter wall 3 (as illustrated in FIGS. 2 and 5). Alternatively, the perimeter edge 11 of the pull off lid 8 may be attached to the top edge 6 of the perimeter wall 3 of the tubular body 2 (as illustrated in FIGS. 1 and 6).

Figure 6:
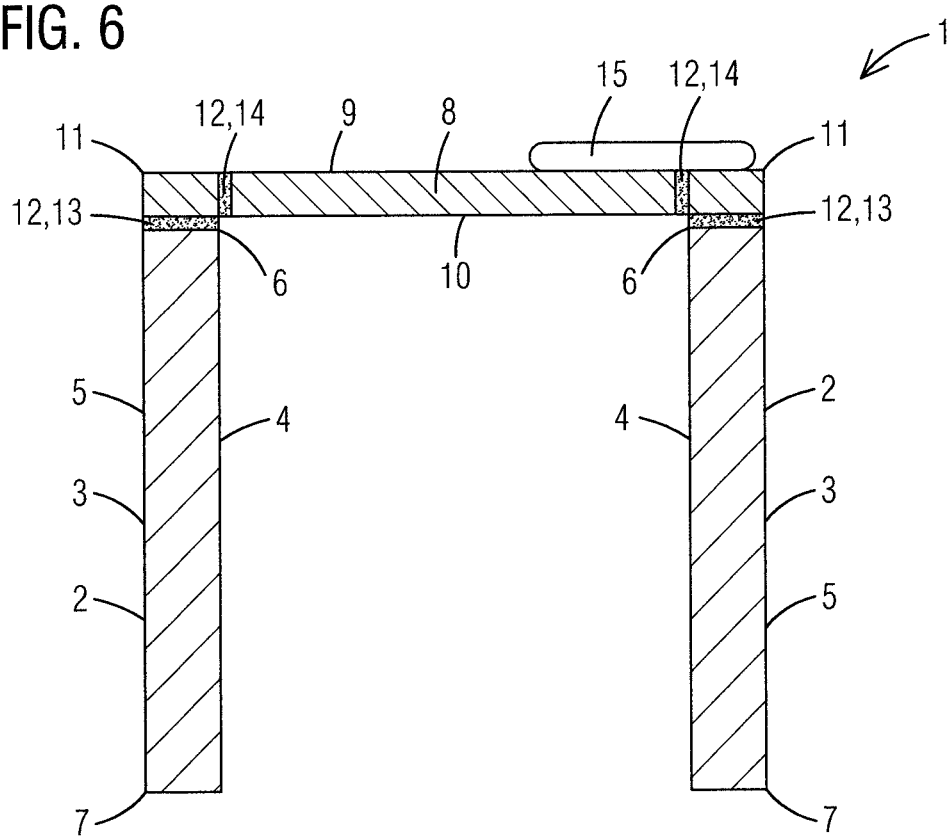
FIG. 6 is a sectional side view of the present invention along line 6-6 of FIG. 1.

The pull off lid 8 may be attached to the perimeter wall 3 via an attachment means 12, such as an adhesive 13 (as illustrated in FIG. 6) or a scored line 14 (as illustrated in FIG. 5) that tears when upward pressure is applied to the pull off lid 8. A pull ring 15 is preferably located proximate to the perimeter edge 11 of the pull off lid 8. The pull ring 15 may be stationary or attached via a pivot point 16, such as a rivet 17, that allows the pull ring 15 to act as a lever so when a proximal end 15A of the pull off 15 is pulled upward, a distal end 15B pushes downward on the perimeter edge 11 of the pull off lid 8 breaking the attachment between the pull off lid 8 and the perimeter wall 3 off the tubular housing 2.

Figure 7:
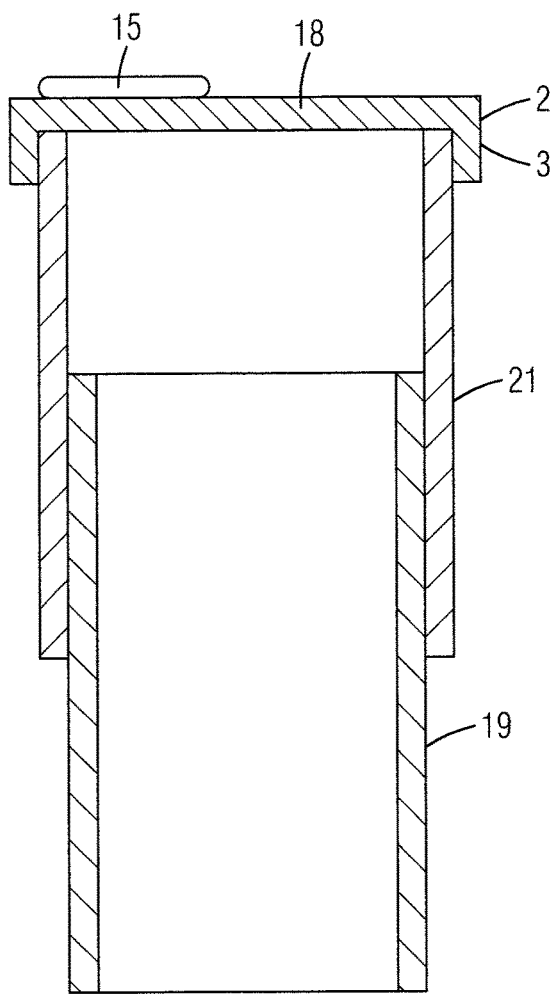
FIG. 7 is a sectional side view of the present invention having an integrated lid covering the end of a pipe.
Figure 8:
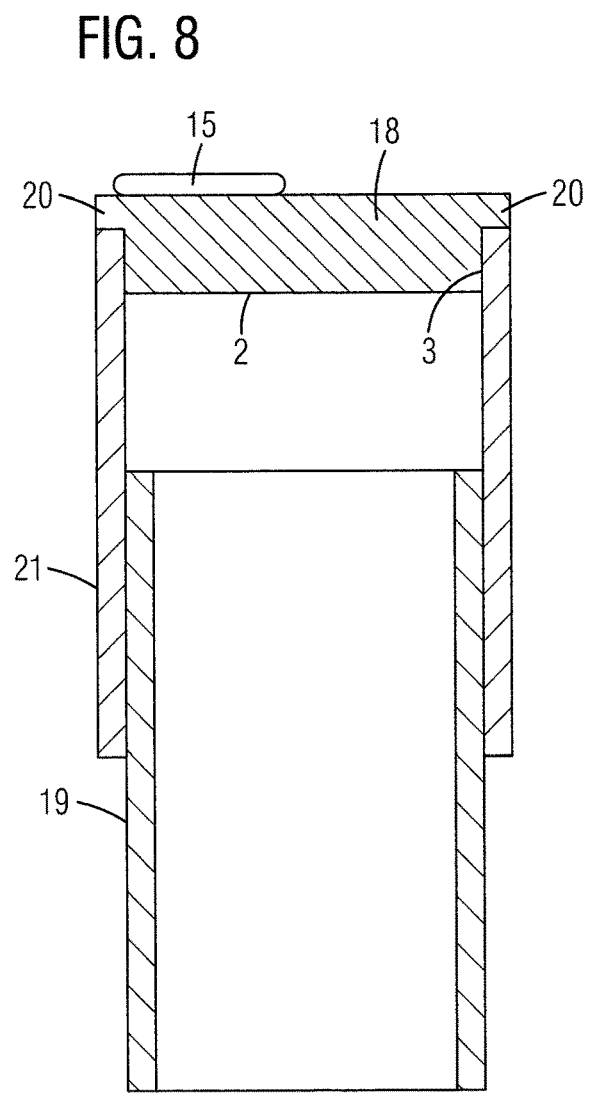
FIG. 8 is a sectional side view of the present invention having an integrated lid inserted into the end of a pipe.

Alternatively, the pull off pipe cap 1 may have a tubular housing 2 with a perimeter wall 3 and integrated lid 18. The pull off pipe cap 1 is removeably attached to an end of a pipe 19 via a pressure fit and/or a temporary adhesive. A pull ring 15 allows the pull off pipe cap 1 to be pulled upward thereby breaking the adhesive seal or pressure fit between he pull off pipe cap 1 and the end of the pipe 19. The pull off pipe cap 1 may fit inside of the pipe 19 and have a flange 20 that extends over the pipe 19 or a pipe fitting 21 (as illustrated in FIG. 8). Alternatively, the pull off pipe cap 1 may fit over the pipe 19 or a pipe fitting 21 (as illustrated in FIG. 7).

The circular-shaped pull off lid 8 is preferably constructed out of metal to allow the pull off pipe cap 1 to be found using a metal detector. In addition, the circular-shaped pull off lid 8 may be colored to increase the visibility thereof.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A pull off pipe cap comprising:
a tubular body having a perimeter wall;
said perimeter wall having an inner surface, an inner circumference, an outer surface, a top edge and a bottom edge, the inner circumference being of sufficient size so that the cap fits over a pipe to be capped; and
a circular-shaped pull off lid having an upper surface, a lower surface and a perimeter edge being removeably attached to the top edge of the perimeter wall, wherein said perimeter edge of the pull off lid is attached to the inner surface of the perimeter wall of said tubular body.

2. The pull off pipe cap of claim 1 wherein:
said pull off lid is attached to the perimeter wall by an adhesive.

3. The pull off pipe cap of claim 1 wherein:
said pull off lid is attached to the inner surface of the perimeter wall via a releasable attachment means.

4. The pull off pipe cap of claim 3 wherein:
said releasable attachment means is an adhesive.

5. The pull off pipe cap of claim 3 wherein:
said releasable attachment means is a scored line.

6. The pull off pipe cap of claim 1 wherein:
said pull off lid is attached to the top edge of the perimeter wall by an adhesive.

7. The pull off pipe cap of claim 1 further comprising:
a pull ring located proximate to the perimeter edge of the pull off lid.

8. The pull off pipe cap of claim 1 further comprising:
said pull off lid is attached to the perimeter wall via a releasable attachment means; and
a pull ring located proximate to the perimeter edge of the pull off lid.

9. The pull off pipe cap of claim 3 further comprising:
a pull ring located proximate to the perimeter edge of the pull off lid.

10. The pull off pipe cap of claim 1 further comprising:
said pull off lid is attached to the top edge of the perimeter wall via a releasable attachment means; and
a pull ring located proximate to the perimeter edge of the pull off lid.

* * * * *